RECORDING AND PLAYING-BACK TELEVISION PROGRAMS, BY WIDE-BAND CROSS-SCANNING RECORDINGS

Original Filed May 4, 1954

2 Sheets-Sheet 1

Inventors:
Thos. A. Banning, Jr.,
& Agnes J. Ranseen,
Executrix of Estate of
Emil L. Ranseen, deceased,
by Thos. A. Banning Atty.

Sept. 6, 1966 T. A. BANNING, JR., ETAL 3,271,514

RECORDING AND PLAYING-BACK TELEVISION PROGRAMS, BY WIDE-BAND CROSS-SCANNING RECORDINGS

Original Filed May 4, 1954

2 Sheets-Sheet 2

Inventors:
Thos. A. Banning, Jr.,
& Agnes J. Ranseen,
Executrix of Estate
of Emil L. Ranseen, deceased,
by [signature] Atty.

United States Patent Office 3,271,514
Patented Sept. 6, 1966

3,271,514

RECORDING AND PLAYING-BACK TELEVISION PROGRAMS, BY WIDE-BAND CROSS-SCANNING RECORDINGS

Thomas A. Banning, Jr., Chicago, Ill., and Emil L. Ranseen, deceased, late of Chicago, Ill., by Agnes J. Ranseen, executrix, Evanston, Ill., assignors, by direct and mesne assignments, to Thomas A. Banning, Jr., trustee, Chicago, Ill.

Application Dec. 18, 1964, Ser. No. 419,612, which is a division of application Ser. No. 94,651, Mar. 9, 1961, which in turn is a division of application Ser. No. 427,428, May 4, 1954, now Patent No. 2,976,354, dated Mar. 21, 1961. Divided and this application Oct. 23, 1965, Ser. No. 504,250
1 Claim. (Cl. 178—6.6)

Figure 1:
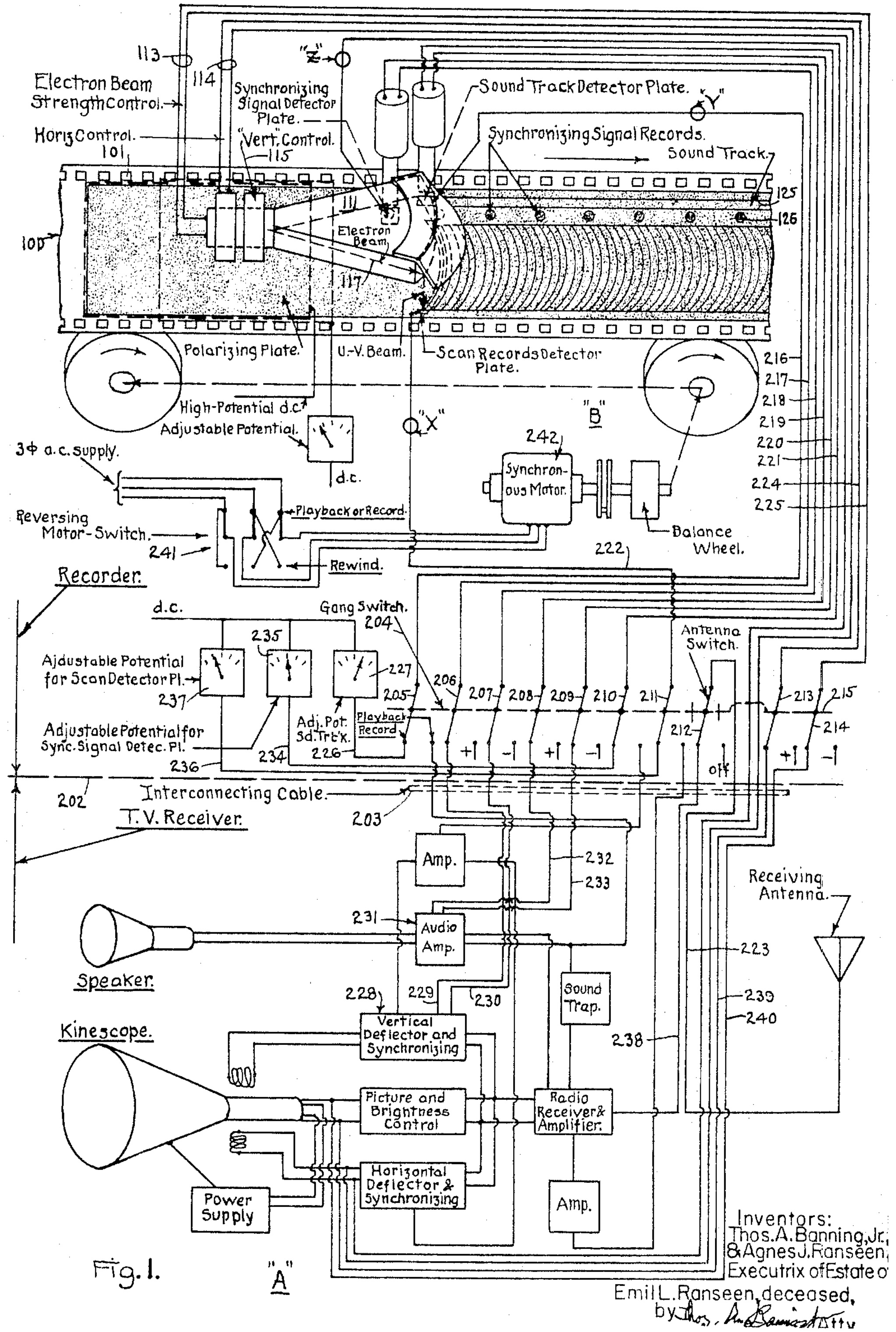

This invention relates to improvements in recording and playing-back television programs, by wide-band, cross-scanning recordings. This application is a division of our co-pending application Serial No. 419,612, filed Dec. 18, 1964, and still pending; which application, Serial No. 419,612, was a division of our application Serial No. 94,651, filed March 9, 1961, issued as Letters Patent No. 3,164,685, Jan. 5, 1965; and which application, Serial No. 94,651, was a division of our application Serial No. 427,-428, filed May 4, 1954, and issued as Letters Patent No. 2,976,354, March 21, 1961.

The present application concerns itself generally to the production of cross-scanned recordings of a television program being received and translated either by a conventional television receiver, or by suitable equipment constituted to produce the necessary translations to enable production of the desired cross-scanned recording on the tape; and to the means whereby such so-recorded, cross-scanned recording may afterwards be sensed and translated for production of the translated raster on the viewing screen of such television receiver. Under the operations to be hereinafter described, the video signals of the program are recorded as cross-scans of a wide-band record receiving surface; and the audio signals may be and are recorded on such tape, either as a linear record, according to conventional or similar operations, or as cross-scans on the same tape whereon the video cross-scans are recorded.

During playing-back to a television receiver for reproduction of the televised program, it is evident that proper provision must be made for causing the cross-scanning sensing element to sense the cross-scans at speed corresponding to the rate of horizontal deflections being produced in the television receiver; and also to ensure that the so-sensed cross-scans shall correspond, spatially to the horizontal deflections of the receiver kinescope beam, so that a perfect translation of the video signals shall be produced on the kinescope viewing screen. In a co-pending application we have disclosed synchronizing and phasing means whereby these results may be produced, and it is not here necessary to illustrate and describe such equipment. However, it is now noted that during the tape recordings produced as cross-scans, we have, in such earlier applications and patents, disclosed means whereby synchronizing records are produced along the tape (preferably along one edge thereof), corresponding to the bursts or signals denoting completion of successive fields of scan of the received video signals, each such synchronizing signal record being placed on the tape at the proper location to give its synchronizing signal (during playing-back) for delivery of such synchronizing signal back to the horizontal deflection means of the television receiver. Thus, the fields of horizontal deflections produced in the receiver, will match the groups of cross-scan produced video signal recordings, carried by the tape, and a properly synchronized translation of the recorded video program may be produced.

In each of the applications for patents, already defined herein, we have discolsed cross-scan recording means, and sensing means for the playing-back of the recorded signals, including the recording of the video signals; and also the recording of the corresponding audio which correspond to such video signals, each by a cross-scanning operation; and we have also in each such antecedent application, disclosed means to sense the recorded cross-scan audio signals, concurrently with the sensing of the cross-scan recorded video signals. In each of such applications we have also shown means to produce the synchronizing signal records concurrently with production of the bursts or signal denoting completion of successive fields of scan horizontally by the kinescope beam; and we have, in such cases also shown means to deliver the sensing of such synchronizing signals, to the saw-tooth generator or other unit by which the horizontal deflections of the kinescope beam are produced. In each such case we have also disclosed interconnections between the cross-scanning units of both the video scanning unit of the recorder and of the audio scanning unit of the recorder. Accordingly, in each such antecedent application and in the present application, the sensing of the recorded cross-scan audio signals and of the recorded cross-scan video are produced synchronously and in phase. Also, both the video sensed signals and the audio sensed signals, will be properly placed with respect to the horizontal deflections produced in the receiver kinescope, provided that the tape speed during playing-back is at all times exactly the same as was the tape speed during the recording operations; and that the rate of cross-scans produced in the receiver-senser element for both the video signal records and the audio signal records, are the same as such rates were during each elemental length of the tape movement. In such copending application relating to synchronizing and phasing the operations, we have disclosed means to cause the tape speed to be continuously corrected in manner to ensure the desired synchronized and phased operations. Nevertheless, it is evident that the presence of the synchronizing signal records and the means to produce such records on the tape in proper spatial relationship with respect to the cross-scan recordings, is an important component of the structures needed for satisfactory production of the recordings, and for subsequent correct translation of both the video and the audio cross-scan recordings.

An important object of the present invention is to provide the means to accurately produce the synchronizing signal records on the tape during recording, as well as means to accurately sense such recorded synchronizing signals and deliver the sensed signals to proper elements of the structure.

Further objects are to provide simple and properly coordinated connections between the conventional television receiver and the elements of the recorder, to enable, by simple switching operations, to cause the recorder to make its cross-scanned recordings concurrently with the production of the video and audio components of the program, by the conventional receiver; and, by simple reverse settings of the switching elements, to cause the recorded video and audio cross-scans (or the recorded video cross-scans and the linear audio-recording), to be properly delivered to the elements of the receiver, for production of the program by the playing-back operation.

Other objects and uses of the invention will appear from a detailed description of the same, which consists in the features of structure and combinations of parts, hereinafter described and claimed.

Figure 2:
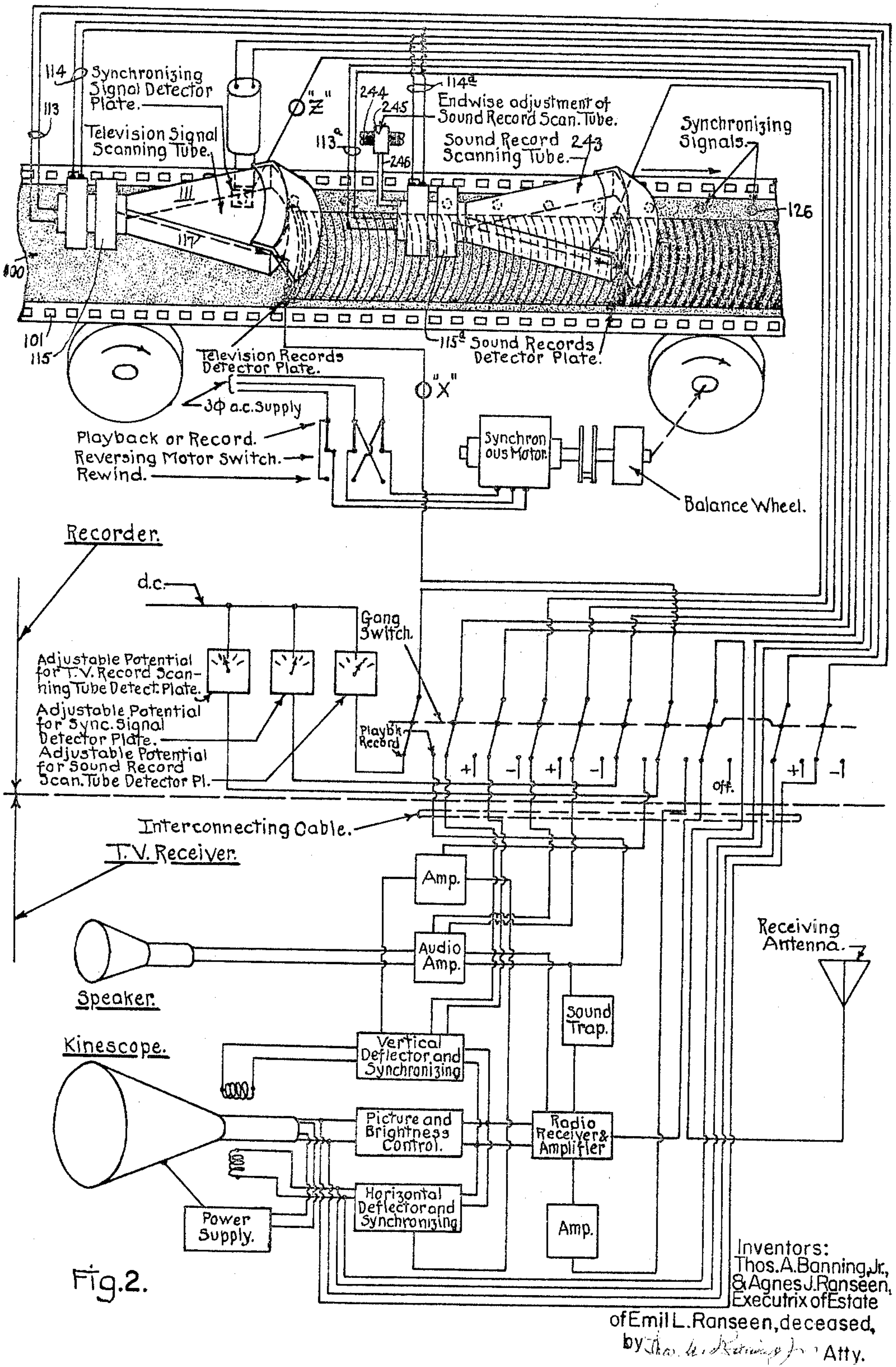

In the drawings:

FIGURE 1 shows an embodiment wherein there is included a conventional form of television receiver (shown more or less schematically), with provision for reception and translation of the received radio frequency video and audio signals, and translation thereof for production of the picture accompanied by the sound component of the program; and this figure also shows, schematically, a wide-band, cross-scan tape recorder of the type disclosed in the original application from which the present application is descended, being present Patent No. 2,976,354, by way of illustration of a wide-band cross-scanning unit; and this figure also shows interconnections between such television receiver and such recorder, constituted to cause the recorder to produce the cross-scan recordings corresponding to the horizontal deflections produced on the raster; such interconnections also including the provision of means to deliver to the synchronizing recorder a synchronizing record corresponding to each burst or signal defining re-setting of the saw-tooth generator or other deflection producing unit of the receiver; together with the means to enable simple switching to either the record producing operation or the record translating operation; this figure also including means constituted to produce a record of the audio signals from the receiver, in the form of a linear track according to conventional operations, and for playing-back such audio signals to the speaker of the receiver during playing-back; and FIGURE 2 shows an embodiment similar to that of FIGURE 1; but in the present case provision has been made for producing the audio signal record in the form of cross-scan recordings on the tape, corresponding spatially to the cross-scans of the video recordings.

In each of FIGURES 1 and 2, the tape 100 comprises a band of sufficient width to accommodate the cross-scans shown thereon in the form of generally circular arcs. When the tape is provided with a magnetically responsive surface these cross-scans are produced in the manner fully disclosed in our Patent No. 2,976,354 already referred to. To this end the cross-scanning unit 111 is supported in proximity to the tape surface, such unit including a deflectable beam, conveniently in the form of an electron beam projected from a conventional gun in the neck of the unit, and exciting a phosphor surface to produce a secondary beam which is capable of penetrating the envelope of the unit 111 to produce its effect outside of the unit (or, as in embodiments disclosed in said parent Patent No. 2,976,354, to excite conductors which extend to the outside of the envelope, and to locations and forms such as to produce the desired effects in combination with the recording surface of the tape). Thus, during the recording operations, such unit performs the office of a record producing unit. Provisions are also made for using the same deflectable beam unit for sensing previously recorded recordings, by sense scanning the recorded scans on the tape, thus producing effects which may be reflected to proper detector plate elements located close to the tape and subject to receiving and sensing the effects produced on them by reason of the strengths of the recorded scans which are being thus sensed. All such structures are full disclosed and their operations full described in said parent patent, and in various divisions of such patent, some of which divisions have been issued and some of which are still pending. It is thus deemed unnecessary to describe the forms and functions of such deflectable beam units further, beyond such further descriptions as may be directly related to the subject-matter to which this case is directed.

The beam strength of each such deflectable beam unit is controlled by lines 113 leading to or from such unit. It is here noted that in the embodiment shown in FIGURE 2 a second deflectable beam unit 243 is shown in position proximate to the tape surface. This unit is of construction the same as the unit 111 shown in that figure, and its operations for recording or sensing recorded scans are the same in principle as such functions of the unit 111. This second scanning unit 243 is provided for producing cross-scan recordings of the audio frequency signals of the program, and for afterwards sensing such audio signals to deliver the sensed signals to proper translating elements, as will hereinafter appear. The beam strength controlling lines for this second unit 243 are shown at 113ᵃ in FIGURE 2. The lines 114 are provided for producing and controlling the lateral deflections of the beams of the units 111; and the lines 114ᵃ are provided for producing and controlling the lateral deflections of the beam of the unit 243.

In the structures shown in FIGURES 1 and 2 the scan detector plates for the units 111 are shown below the tape surface by dotted lines, and the legended "Television Records Detector Plate" or "Scan Records Detector Plate;" and the detector plate for the unit 243 in FIGURE 2 is legended "Sound Records Detector Plate." These detector plates are used during the sensing operations, as will presently appear. In each instance the detector plate is connected to a line leading to other elements which will be considered hereinafter. Since, in the embodiment shown in FIGURE 1 the audio recordings are produced by linear scan, there is also shown in that figure the audio recording and sensing head (not numbered) directly above and registered with the audio track 125, and controlled by the lines 219 and 220. These structures will be hereinafter described in sufficient detail, and their relations to other units will also be disclosed.

In each of the FIGURES 1 and 2 there is shown a recording head (also used during sensing) directly above the tape surface in alignment with the synchronizing signal track 126 of such figure. These synchronizing signal producing and sensing units serve to produce, on the tape during the recording operations, successive synchronizing signal records, by control from a unit which functions to produce a synchronizing signal at completion of each field of cross scans, or, during playing-back, serves to sense the arrival of each such synchronizing signal recording, at the location of the recording-sensing head. The synchronizing signal head shown in FIGURE 1 is controlled by the lines 217 and 218. Similar lines are provided in connection with the synchronizing head shown in FIGURE 2, not numbered. These lines and their terminal connections will be described hereinafter.

Below the dashed line we have shown, schematically, a conventional television receiver, including the antenna connection thereto for receiving incoming signals. The showings of such television receiver are the same in both of FIGURES 1 and 2; and the principal difference between these two figures resides in the fact that in the arrangement of FIGURE 1 the audio signals are recorded in a lineal scan path or track, 125, whereas in the arrangement of FIGURE 2 we have made the provision for recording the audio signals at audio frequency, in the form of cross-scans produced across the recording width of the tape. Such audio frequency cross-scans may be recorded either between the successive cross-scans for the video signals which are at radio frequency, or the audio frequency audio signals may be recorded directly upon the cross-scans for the video. Due to the fact that the cross-scans will preferably be produced as close together as is consistent with avoidance of cross-talk between successive scans and consistent with avoidance of lateral magnetic transfers, it will usually be found that much, if not all of the audio frequency cross-span recording will be produced directly or partially on previously recorded video scanning. However, due to the great difference between the audio frequency and the radio frequency recordings, no difficulty will be found in afterwards accurately scanning and translating the two sets of cross-scans without mixing the subsequent translations, in the circuitry of the receiver.

Both of the blocks "Vertical Deflector and Synchronizing" and "Horizontal Deflector and Synchronizing" as titled in both of the figures are connected together, and such units are connected by the lines 229 and 230 to the switching facility presently to be referred to in more detail; and from such switching facility the two lines 217 and 218 lead to the synchronizing signal recording unit located above the track wherein the synchronizing signal records are produced, being the dots identified as 126 in both of the figures. One at least of the units "Vertical Deflector and Synchronizing" and "Horizontal Deflector and Synchronizing" is provided with means constituted to produce a signal or burst at completion of each group of scanning signals, being the horizontal deflections of the kinescope. Conventionally, under present rulings of the F.C.C., such signals or bursts are produced at completion of, or for, each group of 262½ scans. We therefore link the lines 229 and 230 to proper elements of one of such deflection and synchronizing signal producing units, to thus deliver a synchronizing signal to the recording element for such signals, thus placing the record of such synchronizing signal on the tape in proper relation to the cross-scan signals to designate the completion of one field of scans and commencement of the next such field. It is to be noted, however, that since the same unit is afterwards used for sensing the synchronizing signals, as was used for their recording, it is not necessary that each synchronizing signal record be exactly opposite to its cross-scan counterpart, since the distance lengthwise of the tape, between the location of the synchronizing signal record producing unit and the location of the commencement of a cross-scan always remains the same, once the parts have been assembled and calibrated. It is here noted however, that we have provided, in the embodiment of FIGURE 2, means to slightly adjust the distance between the two deflectable beam units 111 and 243, means in the form of the threaded stud 244 and the threaded socket through which such stud extends, 245, for slightly adjusting the unit 243 lengthwise of the tape, to bring the two sets of cross-scannings in to the best relation possible for desired sensing operations which will be produced after the recordings have been made.

The "Synchronizing Signal Detector Plate" element is provided in position for receiving a translation or sensing of each recorded synchronizing signal as the tape travels lengthwise during sensing and translation operations. Such structures are shown in both of FIGURES 1 and 2. Likewise, the "Television Records Detector Plate" and the "Sound Records Detector Plate" are shown in FIGURE 2, and the "Scan Records Detector Plate" is shown in FIGURE 1. Each of these detector plates is mounted in position close to the surface of the tape, to be subject to the magnetic influence produced by the recorded or scanned recording which is, at the moment, being influenced by the presence of the secondary beam outside of the deflectable beam unit, and subject to the effects of the laterally deflectable beam during the scanning travel of such beam. All such detector plates are used for detection during playing-back of the recorded signals, and may be used for raising the base potential of the recordings, during the recording operations.

During the recording operations, the electron beam strength produced in each deflectable beam unit, varies according to the strength of the signal being recorded. Such variations occur many times during each scan, or they may occur not at all during some scans. The strengths of the signals recorded will also vary according to the varying strengths of the deflectable beam in question. Accordingly, during the recording operations the lines 113 in FIGURES 1 and 2, which lines control the beam strengths of the units of which they comprise parts, are to be tied to an element of the circuitry of the receiver, which circuitry element of the receiver is subject to the vaying strengths of the gun of the kinescope from which the program is being recorded. Likewise, during the recording operation, the lines 113$^a$ of the audio recording unit 243 of FIGURE 2, are to be tied to an element of the receiver circuitry, which is subject to the varying strengths of the audio translation being fed to the receiver speaker. The lines 219 and 220 which connect to the audio track recording unit of the embodiment shown in FIGURE 1 are, in that embodiment, to be connected to a proper element of the audio frequency receiver system.

It is thus evident that during the recording operations for both video and audio components of the program, the several units which produce the recordings on the tape are connected to sources of information which are constantly varying. The recordings will thus be of strengths proportional to such variations. Means must be provided constituted to cause each of the detector plates to deliver variations of potential corresponding to the strength of the signal record at each elemental area of the recorded scan, or according to the strength of the recorded synchronizing signal being sensed, as the case may be. To this effect we have provided arrangements such that during sensing on the playing-back, each of the electron beams of the embodiment of FIGURE 2, or the single electron beam of the embodiment of FIGURE 1 will be retained at a steady strength; and such that during the sensing and playing back, the strengths of the synchronizing record sensing units will be retained, each at a steady strength; so that the sensing effect produced by each such unit, and received and detected by the corresponding detection plate, will be varied, above a base value, by amount proportional to the strength of the records being sensed at such point as is being sensed. This is also true as respects the operation of the unit for recording and afterwards sensing the lineal sound track shown in FIGURE 1.

To meet the requirements imposed by the recording operations, and afterwards imposed by the sensing operations, we have shown the following structures:

During the recording operations in FIGURE 1, the lines 113 (224–225) are connected to the lines 239–240, which lead to the "Picture and Brightness Control" unit of the receiver, so that the strength of the deflectable beam of the unit 111 will vary according to the strength of the beam variations in the receiver kinescope. Also, during this recording operation, the sensing plate corresponding to such deflection beam, may be set and held at a steady (but adjustable) potential, to retain the recorded signals at a steady potential above a reference value. This sensing plate operation is produced by the line 222, which, during the recording operation, is connected by the line 236 to the "Adjustable Potential for Scan Detector Plate," unit 237. Afterwards, during playing-back, such detector plate line 222 is connected to the line leading to the "Amp." unit and to the "Radio Receiver and Amplifier" unit the reciver, to thus inject into such "Radio Receiver and Amplifier" unit the scanned signals recorded on the cross-scans, instead of the signals then being detected by the antenna. Also, during the recording operation, the synchronizing signal unit of the recorder is connected by the lines 217–218, through the switching facility, to the lines 229–230 of the receiver, which lines are supplied with the bursts or synchronizing signals corresponding to the completion of the fields of scans in the kinescope of the receiver, and commencement of succeeding fields of such scans. At the same time, the detector plate for such synchronizing signal recording unit, is connected by the line 221, which connects by the line 234 to the "Adjustable Potential for Sync. Signal Detec. Pl." by which the synchronizing signal detector plate may be held at a steady (but adjustable) potential, during the recording operations. Afterwards, during playing-back, such detector plate line 221 is connected to the line leading to the "Amp." unit of the receiver, which unit is connected to the unit 228 "Vertical Deflector and Synchronizing" of the receiver, to thus deliver to such unit 228 signals corresponding to the arrival of the recorded synchronizing signals on the tape. Thus the tape recordings serve to activate the re-setting of the kinescope electron beam to its proper starting position at completion of the group of sensed scans which has been sensed and translated to produce a field of horizontal deflections on the kinescope viewing screen. Thus, during the playing-back, the production of successive sets of horizontal deflections is properly correlated to the sensing of successive sets of cross-scan recordings which correspond to a set of horizontal deflections of the kinescope producing a field of the raster.

The embodiment shown in FIGURE 1 includes a linear sound track 125, and the corresponding recording and sensing head unit above such sound track; and also includes the detector plate legended "Sound Track Detector Plate" beneath the tape at the location of such head unit. During recording, the recording and/or sensing producing head connects by the lines 219–220 to the unit "Audio Amp.," 231 of the television receiver; thus, during television reception, the audio signals which are connected to the speaker of the receiver, are also connected to the recording-head for audio signals, above the tape, thus producing the record of such audio signals, as a linear track. During this operation, the audio signals detector plate therefor, is connected by the line 216–226, to the unit "Adj. Pot. Sd. Trc'k." whereby a steady but adjustable potential may be maintained on the detector plate. Afterwards, during playing-back, such detector plate line 216 is connected to the line (not numbered) leading to the unit "Audio Amp." of the receiver, to thus deliver to such unit varying potentials corresponding to the varying audio signals, as recorded. Also, during playing-back the audio recording and/or playing-back head is connected by the lines 219–220 to the lines 232–233 leading to the unit 231 of the receiver, thus feeding into the audio translating unit 231 the audio recorded signals, from the sound track.

We have referred, in the above description, to a switching facility. This comprises the multi-blade gang switch 204 of FIG. 1. Various of the above described connections include one or more of the blades of such switching facility. It is not deemed necessary to describe such switching facility in detail, as examination of each of the figures will readily disclose the connections to which reference has already been made. Also, the embodiments shown in FIGURE 2 differs from the showing of FIGURE 1, primarily as respects such changes of circuitry as are imposed by reason of the substitution of the cross-scanning unit 243 for producing the cross-scan recorded audio records, in place of the linear track audio recordings already described in connection with FIGURE 1.

Referring again to FIGURE 1 in particular, the following relationships of elements of the receiver and the recorder, are noted:

The electron gun beam strength control is produced, during recording, proportionately to the received signals from the sending station; and the electron gun beam strength of the recorder unit, is also under that same control. During playing-back, the antenna connection to the receiver gun is opened, and connection is substituted for such antenna operation, to the cross-scan sensing unit of the recorder, comprising, in the disclosed structures, the detector plate at the sensing location. Also, during recording, the audio signals recording unit of the recorder is connected to the proper portion of the circuitry of the receiver to be subjected to the audio frequency signals as supplied to the receiver speaker, for recording of the signals thus supplied to the speaker; and during playing-back the audio frequency signals for activation of the receiver speaker, are supplied by the sensing of the so-recorded audio frequency signals carried by the recorder tape. This is true of both of the embodiments shown in FIGURES 1 and 2. Also, during recording, the synchronizing signal bursts defining the completion of deflection operations of the receiver, are supplied from the receiver to the recorded for production of the synchronizing signal records on the tape; and during playing-back, such so-recorder synchronizing records are sensed, and the sensed signals are supplied to the lateral deflection producing unit of the receiver, for resetting the lateral deflections to the starting corner of the raster, conventionally, the upper left-hand corner. The switching facility makes it possible to gang together all of the changes of circuitry between the receiver and the recorder, required for change between the recording and the playing-back operations.

It is noted that, although we have in each of FIGURES 1 and 2, shown the inventive features herein repeated and claimed, as embodied in cross-scanning operations wherein the cross-scans are produced, for both recording and sensing operations, by use of a deflectable beam unit, still we do not intend to limit the inventive features herein disclosed to such forms of cross-scan recording or sensing units, except as we may do so in the claim to follow.

We claim:

Means to produce a record of two continuing series of signals one such series comprising video signals of radio frequency which when sensed and translated comprise the video component of a television program, and the other such series comprising audio signals of audio frequency which when sensed and translated comprise the audio component of a television program; said recording means including a tape having a signal receiving and recording surface, means to drive said tape at substantially uniform rate; two deflectable beam units mounted in proximity to the tape surface, each including beam producing means mounted in proximity to the tape surface and including beam producing means and means constituted to cause cross-scanning deflections of such beam across the scan width of the tape, with production of a beam of force strength proportionate to the varying strength of one of the series of signals delivered to the corresponding deflectable beam unit, and production of a cross-scan recording on the tape of strength corresponding to the strength of such beam; means constituted to produce lateral deflection producing signals, and connections between such lateral deflection signal producing means and each of the deflectable beam units, constituted to cause both of the deflectable beam units to execute lateral deflections at the rate of production of such deflection producing signals; together with means to cause the beam strength of one of the deflectable beam units to vary according to the variations of strength of the video signals of such program, and means to cause the beam strength of the other deflectable beam unit to vary according to the variations of strength of the audio signals of such program.

No references cited.

DAVID G. REDINBAUGH, *Primary Examiner.*

H. W. BRITTON, *Assistant Examiner.*